United States Patent [19]

Beukema

[11] Patent Number: 5,586,265
[45] Date of Patent: *Dec. 17, 1996

[54] PRIORITY ARBITRATING INTERFACE FOR A PLURALITY OF SHARED SUBSYSTEMS COUPLED TO A PLURALITY OF SYSTEM PROCESSING DEVICES FOR SELECTIVE ASSOCIATION OF SUBSYSTEM TO PROCESSING DEVICE

[75] Inventor: Bruce L. Beukema, Hayfield, Minn.

[73] Assignee: International Business Machines Corporation, Armonk, N.Y.

[ * ] Notice: The term of this patent shall not extend beyond the expiration date of Pat. No. 5,506,964.

[21] Appl. No.: 472,852

[22] Filed: Jun. 7, 1995

Related U.S. Application Data

[62] Division of Ser. No. 869,424, Apr. 16, 1992, Pat. No. 5,506,964.

[51] Int. Cl.⁶ .................... G06F 13/368; G06F 13/20
[52] U.S. Cl. ............ 395/200.09; 395/301; 364/228.5; 364/229.5; 364/242.92; 364/230.1
[58] Field of Search .................. 395/823, 860, 395/299, 200.09, 301

[56] References Cited

U.S. PATENT DOCUMENTS

| | | | |
|---|---|---|---|
| 4,607,365 | 8/1986 | Greig et al. | 371/8.1 |
| 5,081,624 | 1/1992 | Beukema | 395/575 |
| 5,206,952 | 4/1993 | Sundet et al. | 395/725 |
| 5,359,715 | 10/1994 | Heil et al. | 395/325 |

Primary Examiner—Thomas C. Lee
Assistant Examiner—Marc K. Weinstein
Attorney, Agent, or Firm—Frederick W. Niebuhr

[57] ABSTRACT

The electronic postage meter includes a printing unit which is responsive to a plurality of motors for printing of a postage indicia in response to a control circuit. The control circuit is comprised of a programmable microprocessor in bus communication with an accounting means having memory units for accounting for the postage printed by the printing unit responsive to the programming of the microprocessor. An integrated circuit includes an address decoding module means for generating a unique combination of ASIC control signals in response to a respective address placed on the bus by the microprocessor. A timer register is responsive to ones of the control signals from the address decoding module to enable writing of the timer data into the timer registers by the microprocessor. The timer unit is responsive to the timer data for timer data. Also included are a plurality of non-volatile memory units. The non-volatile memory unit responsive to other ones of the control signals from the address decoding module to enable the non-volatile memory units for writing data into the non-volatile memory unit by the microprocessor. The integrated circuit further includes a non-volatile memory access timer unit for causing the control signal from the address decoding module enabling the non-volatile memory units to stay active for a predetermined time of the non-volatile memory access timer.

42 Claims, 4 Drawing Sheets

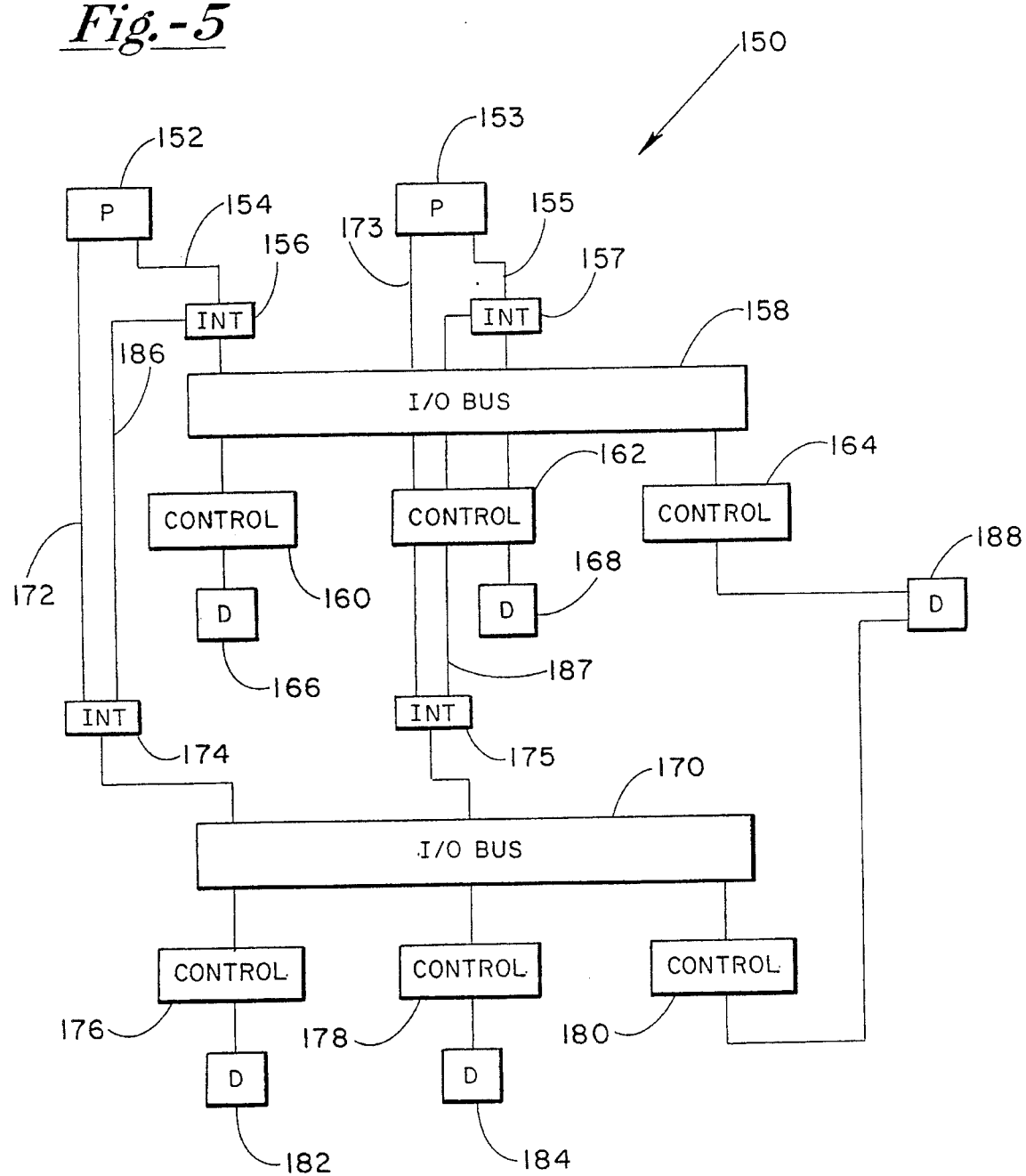

PRIORITY ARBITRATING INTERFACE FOR A PLURALITY OF SHARED SUBSYSTEMS COUPLED TO A PLURALITY OF SYSTEM PROCESSING DEVICES FOR SELECTIVE ASSOCIATION OF SUBSYSTEM TO PROCESSING DEVICE

This is a Divisional of application Ser. No. 07/869,424, filed on Apr. 16, 1992, now U.S. Pat. No. 5,506,964.

BACKGROUND OF THE INVENTION

This invention relates to networks of discrete and remote information processing systems, and more particularly to an efficient and fault-tolerant means for transmitting data between and among the information processing systems.

In many data processing applications, it is advantageous to utilize a network including information processing systems physically remote from one another. One of the better known applications is a computer aided design network consisting of discrete, autonomous systems located throughout one or more plants or other facilities. Each autonomous system has access to all of the remaining systems, eliminating the need to permanently store all data at each location, and insuring that updates in data at any of the systems are substantially immediately reflected in the remaining systems.

The need for such networks arises particularly in environments where certain functions are critical in the sense that failure would result in substantial harm or disruption. Examples include patient monitoring and treatment systems in hospitals, aviation and defense systems, and record management systems in financial institutions. Such systems require a high degree of redundancy, not only in providing alternative paths for data transmission but in providing alternative "back up" processing devices and the ability to rapidly switch operations or functions from one processor to another.

Networks of interconnected systems are known in the art. For example, U.S. Pat. No. 4,564,900 (Smitt) discloses a multiprocessor computer system including a plurality of central processing unit systems connected to one another via an intermemory communication network. The network includes a core designed to cooperate with three satellite systems including device controllers, central processing units and intermemory communication links. Busses in the memory are configured to allow direct data transfer between common memory shared by at least two of the central processing unit systems, without interfering with the central processing units.

This system, while useful in certain environments, does not adequately address the needs of networks including physically remote information processing systems. For transmitting data over the relatively long distances between individual processing systems of a network, fiber optic lines are preferred, as they are virtually immune to interference from outside sources. However, fiber optic lines transmit data serially, giving rise to the need to convert data from its parallel, digital form at the various systems, to serial and optical form for transmission to other systems. Thus, a substantially greater number of components is required to complete the linkage among systems, dramatically increasing the probability of failure of one of the many components of the linkage.

One known approach in this situation is to provide one or more redundant paths, available for transmitting data in the event of a failure along the original path. One such approach is a dual-ring arrangement, for example as disclosed in U.S. Pat. No. 4,837,856 (Glista, Jr.). Glista discloses a fault-tolerant fiber optic coupler/receiver for terminals in a high-speed digital, audio or video data transmission system. Each terminal has one or more bypass lines, and is connected to at least one bypass line from an upstream terminal. Logic on the terminal selects an input from either the primary line or one of the bypass lines, based on predetermined values. A pair of rings is disclosed, both carrying data unidirectionally and in the same direction. U.S. Pat. No. 4,835,763 (Lau) discloses a dual-ring network in which unidirectional rings transmit data in opposite directions. While these arrangements would be expected to perform satisfactorily, their direct application in a network of multiple systems would require multiple point-to-point serial links and excessive electrical loading and circuit card real estate requirements at the processor interface level.

One approach to providing redundancy without point-to-point serial links is disclosed in U.S. Pat. No. 5,081,624 (Beukema), assigned to the assignee of the present application and incorporated herein by reference. More particularly, a fault tolerant connection is provided from a local processing station to several remote processing stations, each including an I/O bus and an associated I/O bus interface logic circuit. Two of the bus interface logic circuits are connected directly to the processor interface circuit, via separate direct links. Intermediate bus interface circuits and I/O busses of the intermediate remote stations are connected between the two directly-connected bus interface circuits, in a series arrangement including alternate link segments and bus interface circuits. Each of the bus interface circuits has pass-through capability for transmitting data in either direction, and the links and link sections also are bidirectional. This enables transmission of data in either direction and on either path between the processor interface circuit and any one of the remote stations. While this interconnection arrangement is successful, there has remained room for further improvements that enhance communications among two or more discrete information processing systems, remote from one another.

SUMMARY OF THE INVENTION

Therefore, it is an object of the present invention to provide an enhanced apparatus and method for communicating data among a plurality of discrete information processing systems.

Another object of the present invention is to provide a network of discrete information processing systems, with many redundant paths for improved transmission of data among the systems but without undue complexity and load at the system processors.

Another object of the invention is to provide a network of interconnected but autonomous system processing devices, in which each of the processing devices has more direct access to all I/O device controllers of the network.

A further object is to provide a network of autonomous processing devices and I/O devices, in which further added processing devices are "transparent" to processing devices already part of the network, and in which added I/O devices are immediately and more directly available to all of the processing devices.

Yet another object of the invention is to provide a network of information processing systems with multiple system processing devices are able to share I/O busses via serial data transmission links, and in which further system processing devices can be added to the network by simpler and more direct physical connections, without modifying the arbitration programs controlling access to the shared busses.

To achieve these and other objects, there is provided a data processing and transmission network having a fault-tolerant coupling of a plurality of information processing systems. Each of the plurality of information processing systems includes a system processing device. The network further includes a plurality of shared sub-systems remote from the information processing systems. Each shared sub-system includes an I/O bus. The systems and sub-systems are coupled by multiple serial data transmission links, comprised of a plurality of link sets. The links of each link set are coupled to an associated one of the system processing devices. Further, individual links of the set are coupled individually to different ones of the shared sub-systems, whereby each link set operatively couples its associated system processing device with each one of the shared sub-system busses. Each of the shared sub-systems further includes an arbitration means for resolving contentions among the system processing devices for control of the associated I/O bus.

Preferably, each of the shared sub-systems includes an associated group of I/O bus interface logic circuits. Each bus interface logic circuit is coupled between its associated I/O bus and one of the data transmission links. Each shared sub-system also can include one or more device controllers in the form of a device controller set coupled to the I/O bus. Thus, various I/O devices can be joined to the I/O bus, each device being coupled through one of the device controllers. The arbitration means can include arbitration logic circuits in the bus interface logic circuits and in the device controllers, communicating with one another via the shared I/O bus.

Thus, all of the system processing devices are coupled to one another through each of the shared I/O busses and associated bus interface logic circuits, for a high degree of redundancy among the processing systems. Further, each system processing device is coupled to all of the I/O devices, more particularly via one of its data transmission links, the associated bus interface logic circuit, the associated bus and the device controller between the I/O bus and the requested I/O device. The requesting system processing device therefore gains access to the requested I/O device without the need to communicate with any of the other system processing devices. In other words, as to each of the system processing devices, all other system processing devices on the network are transparent.

A network in which all system processing devices share each I/O bus affords maximum redundancy. However, it is contemplated within the present invention to provide somewhat less redundant but more flexible configurations. For example, additional I/O busses within the network can be coupled to some, but not all, of the system processing devices. Alternatively, one or more additional busses can be coupled to just one of the system processing devices. Access to the I/O devices of such an I/O bus can be controlled solely by the selected system processing device.

Further in accordance with the present invention, the network can be modified to enhance redundancy. For example, a redundant transmission link can be provided between at least two of the sub-systems, preferably directly between bus interface logic circuits coupled to the same system processing device and to different I/O busses. Another modification for improved redundancy is the coupling of a single I/O device to two or more different I/O device controllers, with each device controller coupled to a different I/O bus. This arrangement allows the system processing devices to gain access to the I/O device through any of the connected busses.

Thus in accordance with the present invention, a network of information processing systems exhibits a high degree of redundancy without undue complexity and power requirements at the system processor level. The system processing devices are transparent to one another, and each processor has direct access to all I/O devices connected to the shared I/O busses. Any further I/O devices connected to the shared busses become immediately available to all, of the system processing devices. Further system processing devices can be added to the network, with no need to modify either the physical connections of components or the shared protocol for queuing and executing tasks.

IN THE DRAWINGS

For a further understanding of the above and other features and advantages, reference is made to the following detailed description and to the drawings, in which:

FIG. 5 is a schematic view of a pair of information processing systems configured according to yet another embodiment of the invention.

DETAILED DESCRIPTION OF THE PREFERRED EMBODIMENTS

Figure 1:
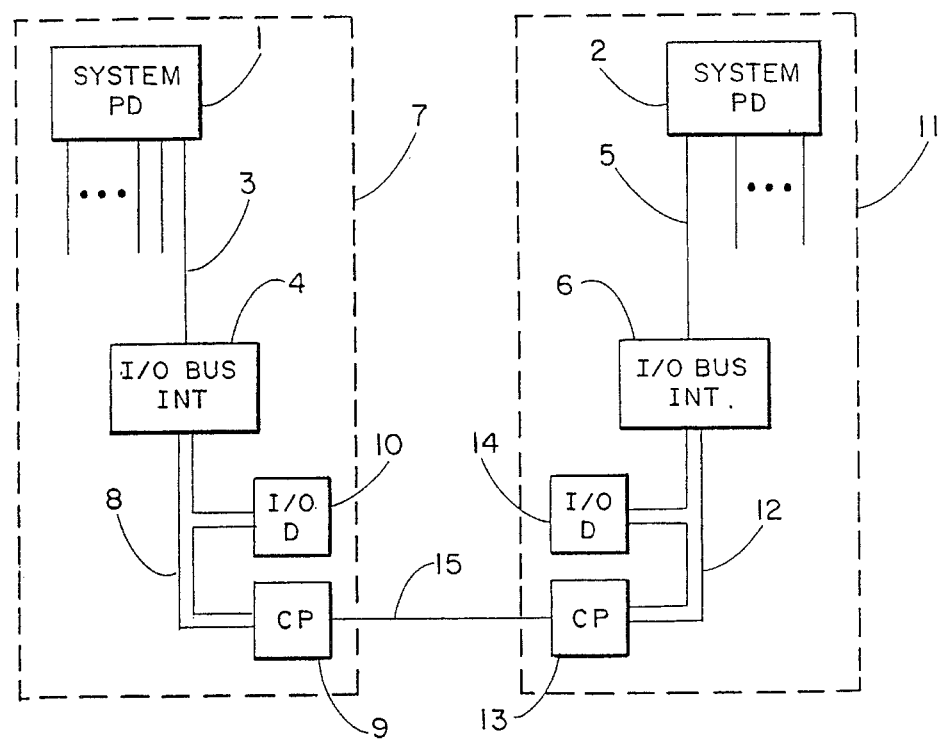
FIG. 1 is a schematic view of a typical prior art configuration for a network of discrete information processing systems.

Turning now to the drawings, there is shown in FIG. 1 a network that includes a plurality of discrete information processing systems, each system having a system processing device as indicated at 1 and 2 for two of the systems. A plurality of fiber optic data transmission links are connected to each system processing device, including a link 3 connecting processing device 1 to an I/O bus interface logic circuit 4. A similar link 5 connects processing device 2 with an I/O bus interface logic circuit 6.

Bus interface circuit 4 and processing device 1 are part of a power domain 7. Power domain 7 further includes an I/O bus 8 connected to bus interface circuit 4 and a communication I/O processor 9 connected to the I/O bus. A device controller 10, e.g. for a disk drive or a tape drive, is connected to I/O bus 8. A power domain 11 includes processing device 2, an I/O bus 12 connected to bus interface circuit 6, and a communication I/O processor 13 connected to I/O bus 12. A device controller 14 is connected to I/O bus 12. A communications line 15 connects communication I/O processors 9 and 13, for data transmission between power domains 7 and 11.

The other data transmission links of processing devices 1 and 2 are connected to other power domains, each with an I/O communication processor for communication with the other power domains of the network.

The performance of any multiprocessor network, during non-failure conditions, is limited by the ability of the redundant processing devices to easily and quickly gain access to all of the I/O devices containing data or programs. When access to a given I/O device is available only by communication with the system processor directly attached to that device, as in the network of FIG. 1, access time is substantial. For example, a message from the system of processor 1 to the system of processor 2 is transmitted as follows:

1. Processing device 1 to I/O bus 8 via link 3 and bus interface circuit 4;
2. I/O bus 8 to communication I/O processor 9;
3. Communication I/O processor 9 to communication I/O processor 13 via communication link 15;
4. Communication I/O processor 13 to I/O bus 12; and
5. I/O bus 12 to system processing device 2 via bus interface circuit 6 and link 5.

Each passage through a processing device involves possible increases in access time, as the message or request may be put on a queue for eventual handling by the processing device. Such queuing may occur at each intermediate processing device not only as a request is sent, but also as data is returned to the requesting processing device in response to the request. Moreover, in a system without fault-tolerance, failure of one of the processing devices or its associated memory locations can cause a total network failure.

Figure 2:
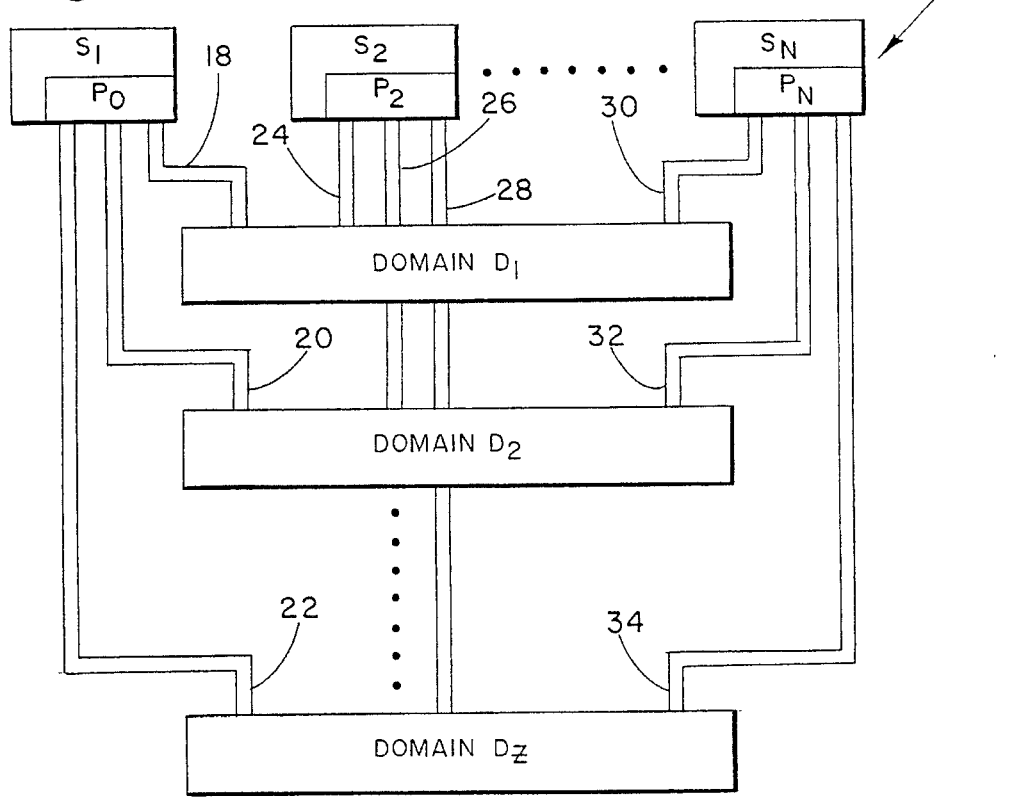
FIG. 2 is a schematic view of a network of information processing systems configured according to the present invention.

FIG. 2 illustrates a network 16 of multiple, discrete information processing systems, configured to substantially reduce access times and eliminate the possibility of total network disruption from failure of one of the system processing devices according to a preferred embodiment of the present invention. More particularly, network 16 includes "N" discrete systems, three of which are indicated at $S_1$, $S_2$ and $S_N$. As indicated at $P_1$, $P_2$ and $P_N$, each of the systems includes a system processing device for performing various operations on data, whether the data are stored within the system processing device itself or fetched from other locations throughout network 16, such as other system processing devices or various I/O devices such as disk drives.

Network 16 further includes "Z" sub-systems or power domains, three of which are shown at $D_1$, $D_2$ and $D_z$. Multiple transition links associate each of the domains with all of the system processing devices, whereby each system processing device may communicate with any one of the other processing devices via any one of the domains. More particularly, data transmission links 18, 20 and 22 couple system processing device $P_1$ with domains $D_1$, $D_2$ and $D_z$, respectively. Similarly, data transmission links 24, 26 and 28 couple system processing device $P_2$ with domains $D_1$, $D_2$ and $D_z$, respectively. Data transmission links 30, 32 and 34 respectively couple system processing device $P_N$ with power domains $D_1$, $D_2$ and $D_z$. Each of the data transmission lines is bidirectional and transmits data serially.

Figure 3:
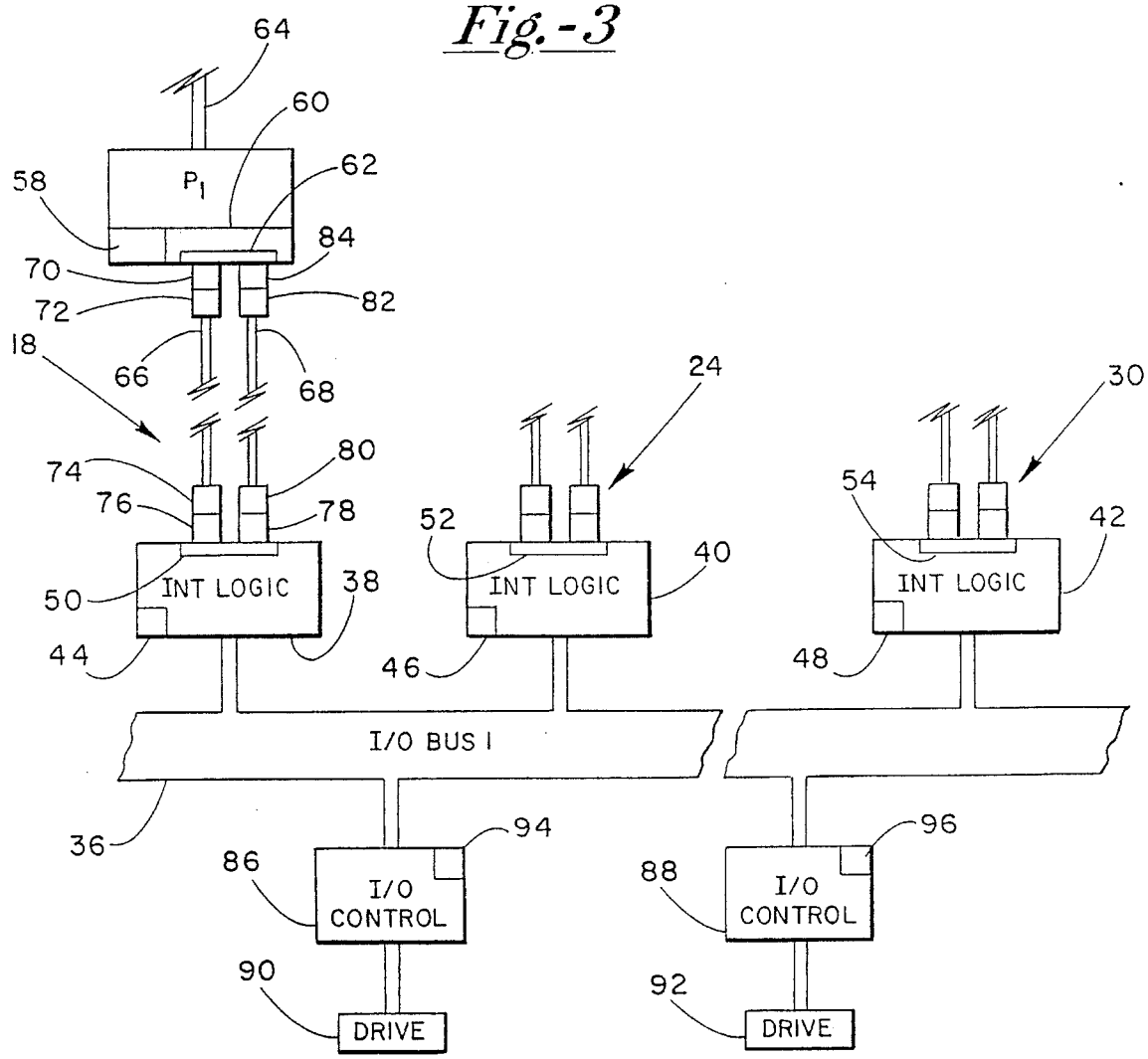
FIG. 3 is a more detailed schematic view showing one of the shared sub-systems in the network of FIG. 2.

FIG. 3 shows a typical sub-system $D_1$, a typical system processing device $P_1$, and their coupling in greater detail. The sub-system includes a bus 36, designated as I/O bus 1. A plurality of I/O bus interface logic circuits are coupled to bus 36, one bus interface logic circuit corresponding to each of the system processing devices. More particularly, three bus interface logic circuits are shown, with logic circuit 38 coupled to processing device $P_1$ through link 18, logic circuit 40 coupled to processing device $P_2$ via link 24 and logic circuit 42 coupled to system processing device $P_N$ via link 30.

Bus interface logic circuit 38 includes an arbitration logic circuit 44. Corresponding arbitration logic circuits 46 and 48 are provided in bus interface logic circuits 40 and 42, respectively. These arbitration logic circuits, along with similar arbitration circuits of the remaining bus interface logic circuits not shown, communicate with one another via bus 36 and cooperate in resolving conflicts among the bus interface logic circuits for control of the bus. Accordingly, control of bus 36 for transmitting data and address and status information is determined based on task priority at the bus interface logic level, rather than at the system processing device level. Apart from its location proximate bus 36, the specific arbitration scheme is not germane to the present invention, and various arbitration schemes are known to those skilled in the art. Consequently, the arbitration scheme is not discussed here in further detail.

Bus interface logic circuit 38 includes a plurality of I/O ports at 50. The remaining bus interface logic circuits also have I/O ports, as indicated at 52 and 54 for circuits 40 and 42, respectively. Processing device $P_1$ includes logic for performing data storage and fetching operations as indicated at 58. The processing device further includes a processor interface logic circuit 60 including a plurality of I/O ports 62. The remaining system processing devices have substantially similar interface logic circuits and circuitry for performing store and fetch operations. A data bus 64 couples system processing device $P_1$ with other components of system $S_1$, e.g. memory or coprocessors of the system.

Data transmission link 18 is a duplex serial transmission link that transmits data bidirectionally and serially between system processing device $P_1$ and bus interface logic circuit 38. The data transmission link includes a pair of fiber optic cables 66 and 68, each transmitting serial optical data. For transmitting data from processor $P_1$ to logic circuit 38, a serializing device 70 is coupled to one of I/O ports 62 for converting parallel processor data into serial form. An optical transmitter 72 is coupled to serializing device 70 for converting the serial data into optical data, for transmission via fiber optic cable 66. An optical receiver 74 converts incoming optical data into bit-encoded data in, serial form, for a deserializing device 76 which converts the data to parallel data provided to one of I/O ports 50.

Data transmission from bus interface logic circuit 38 to system processing device $P_1$ proceeds in much the same manner, through a serializing device 78 coupled to I/O ports 50, through an optical transmitter 80, then via fiber optic cable 68 to an optical receiver 82 and a deserializing device 84 coupled to I/O ports 62. It is to be appreciated that fiber optic cables 66 and 68 can be merged at junctions (not shown) near I/O ports 50 and 62 to provide a single fiber optic cable between junctions.

While only fiber optic cables 66 and 68 of the data transmission link 18 are shown in FIG. 3, each of the data transmission lines coupled to processing device $P_1$ consists of a fiber optic cable pair and associated optical/digital and serial/parallel data conversion components directly coupled to I/O ports 62. Similar pairs of fiber optic cables and data conversion components couple each system processing device with its associated one of the I/O bus interface logic circuits, for a one-to-one correspondence between the processing devices and logic circuits.

A plurality of I/O device controllers are connected to bus 36, two of which are indicated at 86 and 88. Each controller operatively couples I/O bus 36 to a disk drive, as indicated at 90 and 92, respectively. Other I/O devices, e.g. tape drives, work stations, or even communications lines to other remote devices and systems, can likewise be coupled to the bus through respective I/O controllers. Regardless of the number of I/O devices coupled to bus 36, system processing device $P_1$ gains access to each I/O device directly through bus 36, bus interface logic circuit 38 and the controller associated with the particular I/O device.

Controllers 86 and 88, and any additional I/O device controllers (not shown) coupled to I/O bus 36 include respective arbitration logic circuits. The arbitration logic circuits communicate with one another and with the arbitration control circuits of the bus interface logic circuits via I/O bus 36. The arbitration logic circuits in the bus interface logic circuits and controllers cooperate with one another to resolve contentions among the interface logic circuits and controllers for control of bus 36. Since each of the system processing devices gains access to the bus through its associated bus interface logic circuit, the arbitration logic circuits resolve contentions among the system processing devices as well.

While only sub-system $D_1$ is described in detail, the remaining sub-systems are substantially similar. Thus, each of the system processing devices is coupled to all of the remaining processing devices via each of the sub-systems. This affords a high degree of redundancy, in that each system processing device can communicate with any of the other processing devices through any one of the sub-system I/O busses.

A further advantage of network 16 resides in the simple and direct interprocessor connection, as compared to conventional networks of discrete processing systems. For example, a message from system processing device $P_1$ to system processing device $P_2$ is transmitted as follows:

1. From system processing device $P_1$ to I/O bus interface logic circuit 38 via link 18;
2. From interface logic circuit 38 to interface logic circuit 40 via bus 36; and
3. From interface logic circuit 40 to processing device $P_2$ via link 24.

As compared to the data transmission procedure outlined in connection with FIG. 1, the above procedure involves fewer steps. Actually, access time is reduced considerably more than a step comparison suggests, due to the elimination of the communications protocol required in connection with the communication I/O processors of the prior art system. More particularly, a data transfer from one system processing device to another in network 16, as compared to a similar transfer in the prior art system, requires substantially fewer computer program instructions. In some cases required instructions are reduced by factors of one hundred or more.

Yet another advantage is flexibility in size of the network. At the minimum, the network can feature just one shared sub-system including an I/O bus. Further shared sub-systems can be added, limited only by the available I/O ports of the system processing devices. Regardless of network size, certain network features remain unchanged. All system processing devices have direct access to all I/O device controllers, eliminating the need for one system processing device to request access to data through another system processing device. Further added system processing devices remain transparent to processing devices already in the network. However, added I/O devices and I/O device controllers are immediately visible and available to all system processing devices, since each processing device is coupled to all of the I/O busses.

Network size enhancements do not require any modifying of protocols and mechanisms for bus contention resolution or other communication among the processing devices, since all communication involving the processing devices and I/O devices occurs through the bus interface logic circuits and I/O device controllers, with priority contentions being resolved at the sub-system level.

Figure 4:
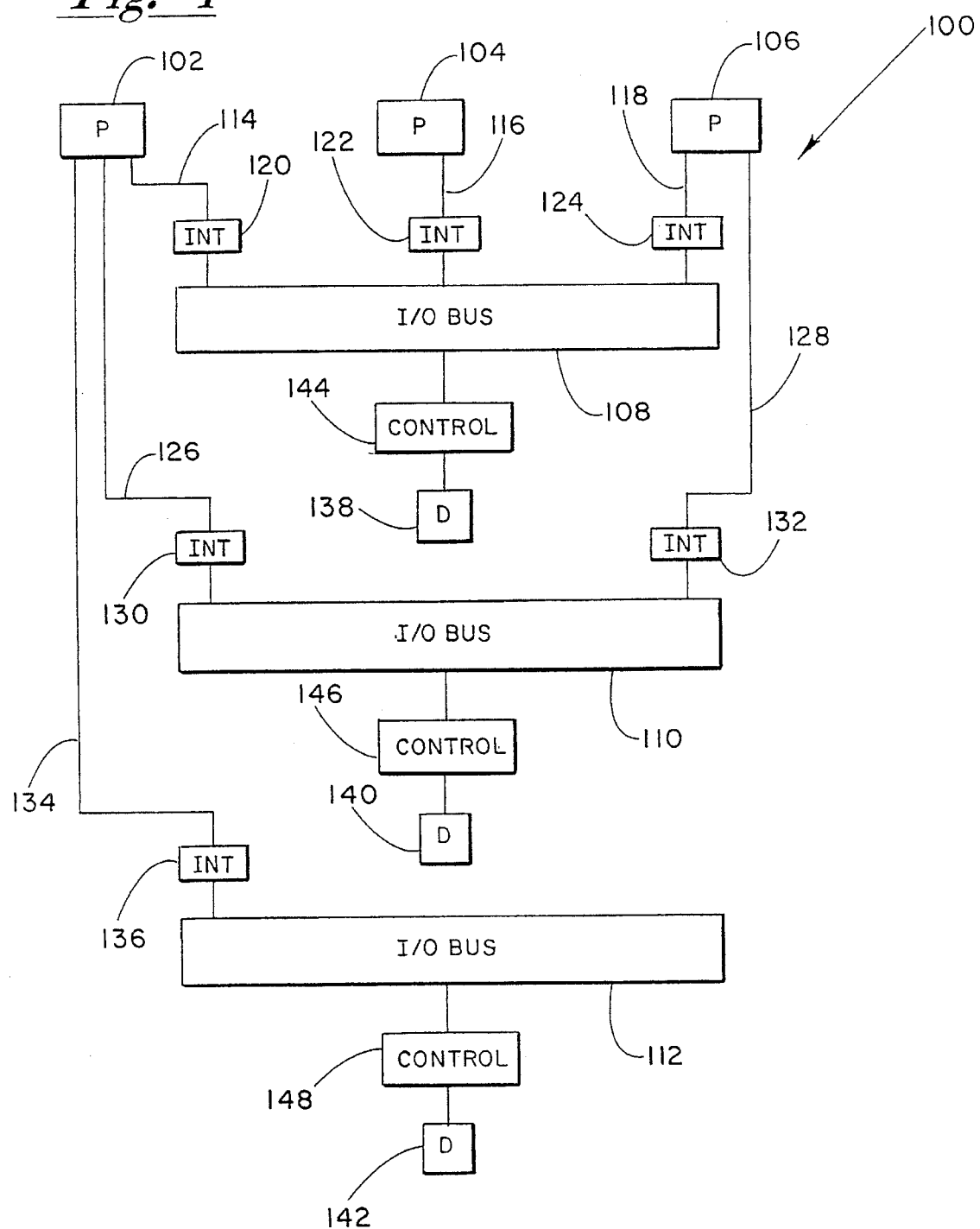
FIG. 4 is a schematic view of part of a network of information processing systems configured according to another embodiment/of the invention.

In network 16, the system processing devices share equally the access to I/O devices coupled to the I/O busses. For certain applications, however, it is either essential or desired to provide one or more I/O devices dedicated to one of the system processing devices, or to couple one of the system processing devices to fewer than all of the I/O device in the network. FIG. 4 illustrates a network 100 of three system processing devices 102, 104 and 106, coupled to one another through three sub-systems including respective I/O busses 108, 110 and 112. All three processing devices are coupled to bus 108, through respective data transmission links 114, 116 and 118 and I/O bus interface logic circuits 120, 122 and 124. Processing devices 102 and 106 are coupled to bus 110 through respective data transmission links 126 and 128 and I/O bus interface logic circuits 130 and 132. Processing device 104 is not coupled to bus 110. Finally, processing device 102 is the only processor connected to bus 112, through data transmission link 134 and an I/O bus interface logic circuit 136. Respective I/O devices 138, 140 and 142 are coupled to the busses through associated I/O device controllers 144, 146 and 148. Other pairs of controllers and devices can be connected to each bus, as desired. In network 100, processing device 102 is the only processing device connected to all three I/O busses, and has exclusive "ownership" of bus 112. Processing device 104 is coupled only to bus 108, and processing device 106 is coupled only to busses 108 and 110.

A network 150, shown in FIG. 5, incorporates two features for enhancing network redundancy. The network includes two system processing devices 152 and 153, and two sub-systems. Both of the sub-systems are shown as remote from processing devices 152 and 153 (and from other system processing devices not shown), and are part of a single power domain. These subsystems could be remote from one another, if desired.

A data transmission link 154 and an I/O bus interface logic circuit 156 couple processing device 152 to an I/O bus 158 of the first sub-system. A data transmission link 155 and an I/O bus interface logic circuit 157 couple processing device 153 to I/O bus 158. Also coupled to I/O bus 158 are I/O device controllers 160, 162 and 164, and I/O devices 166 and 168.

The second sub-system includes an I/O bus 170 coupled to system processing device 152 through a data transmission link 172 and an I/O bus interface logic circuit 174. A data transmission link 173 and an I/O bus interface logic circuit 175 couple processing device 153 to I/O bus 170. I/O device controllers 176, 178 and 180 are coupled to bus 170. Respective I/O devices 182 and 184 are coupled to bus 170 through controllers 176 and 178.

A bidirectional data transmission link 186 is coupled to bus interface logic circuit 156 and to bus interface logic circuit 174, thus to provide a redundant path for transmission of data from system processing device 152 to busses 158 and 170. Similarly, a bidirectional data transmission link 187 is joined to bus interface logic circuit 157 and to bus interface logic circuit 175. Data transmission links 186 and 187 need not be fiber optic and need not transfer data serially, as busses 158 and 170 may be within the same power domain. Accordingly there would be no need for serial/parallel and digital/optical data conversion equipment. Of course, fiber optic links are recommended for coupling a pair of I/O bus interface logic circuits in the case of two sub-systems remote from one another.

Another redundancy enhancing feature is a "twin-tailed" coupling of an I/O device to more than one of the sub-systems. More particularly, a tape drive 188 is coupled to bus 158 through controller 164, and also is coupled to bus 170 through controller 180. Accordingly, any one of the system processing devices can gain access to data in tape drive 188 via either bus. Tape drive 188 is available for storing data considered essential to the network, to the extent that it must remain accessible despite the failure of one the I/O busses.

Thus, in accordance with the present invention, a network of discrete information processing systems is configured to provide each system processing device with direct access to I/O devices coupled to various sub-systems throughout the network. Each system processing device further has access to every other system processing device via an I/O bus in each of the subsystems. This results in multiple alternative paths for interprocessor communication. The multiple system processing devices are configured as equals, each with access to the I/O devices coupled to shared I/O busses through device controllers. The controllers, along with bus interface logic circuits between the processing devices and the busses, resolve contentions for control of the busses. This eliminates the need to provide arbitration logic within the system processing devices, and insures that adding system processing devices to the network does not require modifying communications mechanisms and protocols.

It is to be recognized that while fiber-optic data transmission links are preferred, alternatives include electrical signal conductors, and microwave or other electromagnetic transmission means. Further, a sub-system in its own power domain can be connected to an associated system through a conventional I/O controller from an I/O bus of the system, rather than through a direct link from the system processing device. This approach involves slower rates of data transmission among systems, yet is adaptable to existing systems and provides the advantages of redundancy and shared I/O devices present in the preferred embodiments.

Although specific preferred embodiments of the invention have been disclosed, it is to be recognized that variations in form and detail may be made within the scope of the invention, as defined in the following claims.

What is claimed is:

1. A data processing and transmission network having a fault tolerant coupling of a plurality of information processing systems, the network including:

a plurality of information processing systems, each information processing system including a system processing device;

a plurality of shared sub-systems remote from the information processing systems, each shared sub-system including an I/O bus and an associate group of I/O bus interface logic circuits;

multiple data transmission links for serial and bidirectional transmission of data between the system processing devices and the shared sub-systems and comprised of a plurality of link sets, the links of each link set being coupled to an associated one of the system processing devices and further being individually connected to different ones of the shared sub-systems via the associated group of I/O interface logic circuits, with each of the I/O interface logic circuits being coupled between its associated I/O bus one of the data transmission links, whereby each link set operatively couples its associated system processing device with all of the shared sub-systems;

wherein each of the transmission links of the associated link set further is coupled to an associated one of the I/O bus interface logic circuits; and wherein each of the sub-systems further includes an arbitration means including arbitration logic circuits in the I/O bus interface logic circuit, for determining priority among the I/O bus interface logic circuit of the group contending for control of the associated I/O bus for resolving contentions among the processing devices for control of the associated I/O bus.

2. The network of claim 1 wherein:

each of the system processing devices includes a processor interface logic circuit, and each of the data transmission links of the associated link set is connected at one end to the processor interface logic circuit of the associated system processing device and at the opposite end to said associated one of the I/O bus interface logic circuits.

3. The network of claim 1 wherein:

each of the data transmission links is a duplex serial transmission link.

4. The network of claim 3 wherein:

each of the transmission links comprises at least one fiber optic cable.

5. The network of claim 4 wherein:

each of the transmission links further comprises optical transmitting and receiving devices at opposite ends of each fiber optic cable for converting electronic data into optical data, and means at the opposite ends of each cable for converting parallel data into serial data.

6. The network of claim 1 wherein:

the sub-systems are remote from one another, each sub-system being part of a separate power domain.

7. The network of claim 1 further including:

multiple device controllers comprised of a plurality of device controller sets, each said set including at least one device controller, the device controllers of each device controller set being coupled to an associated one of the I/O busses.

8. The network of claim 7 further including:

a plurality of data storage devices, coupled to the device controllers.

9. The network of claim 8 wherein:

at least one of the data storage devices is connected to at least two of the device controllers.

10. The network of claim 9 wherein:

said at least two device controllers are connected to two different ones of the I/O busses.

11. The network of claim 7 wherein:

the arbitration means further includes arbitration logic circuits in the device controllers, for determining priority among the I/O bus interface logic circuits of each group and the device controllers of the associated device controller set contending for control of the associated I/O bus.

12. The network of claim 1 further including:

at least one further sub-system, each further sub-system being coupled to at least one of the system processing devices and to fewer than all of the processing devices via the data transmission links.

13. The network of claim 12 wherein:

said at least one further sub-system is coupled to just one of the system processing devices.

14. The network of claim 1 further including:

a redundant transmission link coupled at its opposite ends to respective first and second ones of the shared sub-systems.

15. The network of claim 14 wherein:

the redundant link is connected to a first one of the I/O bus interface logic circuits coupled to the I/O bus of the first sub-system, and connected to a second one of the I/O bus interface logic circuits coupled to the I/O bus of the second sub-system.

16. The network of claim 15 wherein:

said first and second I/O bus interface logic circuits are coupled, respectively, to first and second ones of the data transmission links of the same link set.

17. In a data processing network including a plurality of information processing systems, each system including a system processing device; a plurality of sub-systems remote from the information processing systems, each sub-system including an I/O bus and an associated group I/O bus interface logic circuits; and multiple fiber optic links between the system processing devices and the I/O busses for transmission of data between each of the system processing devices and all of the sub-systems: a process for transmitting the data throughout the network, including the steps of:

converting the data from electronic form to optical form for transmission over one of the fiber optic links;

converting the data from optical form to electronic form for reception of the data into one of the information processing systems or into one of the sub-systems via one of the I/O bus interface logic circuits of the associated group;

utilizing arbitration control circuitry within the I/O bus interface logic circuits of the group associated with each of the sub-systems for resolving contentions among the system processing devices for control of the associated I/O bus; and transmitting data from a first one of the system processing devices to a second one of the system processing devices via the associated one of the I/O busses in response to one of the first and second system processing devices gaining control of the I/O bus.

18. A data processing and transmission network having a fault tolerant coupling of a plurality of remote information processing systems, said network including:

a plurality of remote information processing systems, each system including a system processing device;

a plurality of shared I/O busses remote from the information processing systems;

multiple I/O bus interface logic circuits comprised of a plurality of groups of the I/O bus interface logic circuits, the individual I/O bus interface logic circuits of each said group being operatively coupled with an associated one of the shared I/O busses;

multiple data transmission links comprised of a plurality of link sets, the individual data transmission links of each said set being coupled to an associated one of the system processing devices, with each data transmission link of the set further being uniquely coupled to a different one of the shared I/O busses through a selected one of the I/O bus interface logic circuits, whereby all of the system processing devices are coupled to each one of the I/O busses through the associated group of I/O bus interface logic circuits; and an arbitration means associated with each of the I/O busses, comprising arbitration logic in each of the I/O bus interface logic circuits, for resolving contentions among the system processing devices for control of that I/O bus.

19. The network of claim 18 wherein:

each of the data transmission links comprises a fiber optic cable, serial/parallel conversion means at the opposite ends of the cable, and electronic data/optical data conversion means at the opposite ends of the cable.

20. The network of claim 18 further including:

multiple device controllers comprised of a plurality of device controller sets, the device controllers of each controller set being coupled to an associated one of the I/O busses, and a plurality of I/O devices coupled to the device controllers.

21. The network of claim 20 wherein:

at least one of the data storage devices is coupled to two of the device controllers, said two device controllers in turn being coupled to different ones of the I/O busses.

22. The network of claim 20 wherein:

the arbitration means further comprises arbitration logic in the device controllers.

23. The network of claim 18 further including:

a redundant transmission link connected to a first one of the I/O bus interface logic circuits of a first one of the I/O busses, and further connected to a second I/O bus interface logic circuit of a second one of the I/O busses, and wherein the first and second I/O bus interface logic circuits further are coupled to respective data transmission links of the same link set.

24. The network of claim 18 further including:

at least one additional I/O bus, each of the additional I/O busses being coupled to at least one of the system processing devices and further coupled to fewer than all of the system processing devices via the data transmission links.

25. The network of claim 24 wherein:

said at least one additional sub-system is coupled to just one of the system processing devices.

26. A data processing and transmission network for coupling a plurality of remote information processing systems, said network including:

a plurality of remote information processing systems, each system including a system processing device;

a shared I/O bus remote from the information processing systems;

a plurality of I/O bus interface logic circuits operatively coupled with the I/O bus; and a plurality of data transmission links for serial and bidirectional transmission of data, each of the data transmission links being coupled to one of the system processing devices and to an associated one of the I/O bus interface logic circuits, thereby to couple its associated system processing device with the shared I/O bus;

wherein each of the I/O bus interface logic circuits includes an arbitration logic circuit, said arbitration logic circuits communicating with one another via the shared I/O bus to resolve contentions among the system processing devices for control of the I/O bus.

27. The network of claim 26 further including:

a set of device controllers coupled to the I/O bus, and a plurality of data storage devices coupled to the device controllers.

28. The network of claim 27 further including:

an arbitration logic circuit in each of the device controllers, the arbitration circuits of the bus interface logic circuits and the arbitration logic circuits of the controllers cooperating to resolve contentions for control of the I/O bus among the system processing devices and the I/O devices.

29. The network of claim 26 wherein:

each of the data transmission links includes a fiber optic cable with serial/parallel and electronic/optical data conversion means at opposite ends of the cable.

30. In a network including a plurality of information processing systems, and at least one sub-system remote from the information processing systems and comprising an I/O bus, a plurality of data receiving means coupled to the I/O bus wherein each of the data receiving means is capable of receiving data from one of the information processing systems and placing said data on the I/O bus and wherein each data receiving means includes an arbitration logic circuit, and a plurality of data transmission means coupled to the I/O bus wherein each of the data transmission means is capable of reading data on the I/O bus and transmitting the data to one of the information processing systems; a process for transmitting data among the information processing systems, comprising the steps of:

transmitting data from a first one of the information processing systems to a first one of the data receiving means in the remote sub-system;

receiving the data with the first data receiving means;

using the arbitration logic circuits of said plurality of data receiving means to resolve a contention for control of the I/O bus in favor of said first data receiving means, and using the first data receiving means to place the data on the I/O bus in the remote sub-system;

reading the data from the I/O bus in the remote sub-system with a selected first one of the data transmission means in the remote sub-system; and transmitting the data from the selected first data transmission means to a second information processing system of the network.

31. The process of claim 30 wherein:

said step of transmitting data from the first information processing system to the first data receiving means comprises transmitting the data serially over a first fiber-optic link; and said step of transmitting data from the selected first data transmission means to a second information processing system comprises transmitting the data serially over a second fiber-optic link.

32. An apparatus for transmitting data among a plurality of remote information processing systems, including:

a data transmission sub-system set comprised of at least one sub-system shared by a plurality of information processing systems, with the information processing systems being remote from one another and from the at least one sub-system;

wherein the sub-system includes an I/O bus, and a group of associated I/O bus interface logic circuits operatively coupled to the I/O bus, each I/O bus interface logic circuit of the group including an arbitration logic circuit;

wherein each of the I/O bus interface logic circuits of the group further is adapted for operable coupling to a uniquely associated one of the information processing systems, to enable data transmission between each of the information processing systems and the I/O bus via the associated I/O bus interface logic circuit; and wherein the arbitration logic circuits communicate with one another via the I/O bus to resolve contentions among the information processing systems for control of the I/O bus.

33. The apparatus of claim 32, wherein:

said sub-system set is comprised of a plurality of the sub-systems, each sub-system being shared by the plurality of information processing systems and being remote from the information processing systems.

34. The apparatus of claim 33 further including:

multiple data transmission links comprised of a plurality of link sets, the individual data transmission links of each said set being coupled to an associated one of the information processing systems, with each data transmission link of the set further being uniquely coupled to a different one of the I/O busses through a selected one of the I/O bus interface logic circuits, whereby all of the system processing devices are coupled to each one of the I/O busses through the associated group of I/O bus interface logic circuits.

35. A data processing and transmission network, including:

a plurality of information processing systems remote from one another, each information processing system including a system processing device;

at least one sub-system remote from the information processing systems and shared by the information processing systems;

said at least one sub-system including a first I/O bus, and a group of associated first I/O bus interface logic circuits operatively coupled to the first I/O bus, each first I/O bus interface logic circuit including an arbitration logic circuit;

a first device controller coupled to the first I/O bus and containing arbitration logic;

wherein each of the first I/O bus interface logic circuits is uniquely operably coupled to one of the information processing systems, to enable data transmission between each of the information processing systems and the first I/O bus via the associated first I/O bus interface logic circuit; and wherein the arbitration logic circuits of the first interface logic circuits and the arbitration logic of the first device controller communicate with one another via the first I/O bus to resolve contentions among the first I/O bus interface logic circuits and the first device controller for control of the first I/O bus.

36. The network of claim 35 further including:

a further remote sub-system including a second I/O bus and a group of associated second I/O bus interface logic circuits operatively coupled to the second I/O bus; and a data transmission link connected to a selected one of the first I/O bus interface logic circuits and to a selected one of the second I/O bus interface logic circuits, wherein the selected first and second I/O bus interface logic circuits are operably coupled to the same one of said information processing systems.

37. The network of claim 36 further including:

a second device controller coupled to the second I/O bus and containing arbitration logic; and a data transmission means connected to the first device controller and to the second device controller.

38. A data processing and transmission network having a fault tolerant coupling of a plurality of remote information processing systems, said network including:

a plurality of remote information processing systems, each system including a system processing device;

a plurality of shared I/O busses remote from the information processing systems;

multiple I/O bus interface logic circuits comprised of a plurality of groups of the I/O bus interface logic circuits, the individual I/O bus interface logic circuits of each said group being operatively coupled with an associated one of the shared I/O busses;

multiple data transmission links comprised of a plurality of link sets, the individual data transmission links of each said set being coupled to an associated one of the system processing devices, with each data transmission link of the set further being uniquely coupled to a different one of the shared I/O busses through a selected one of the I/O bus interface logic circuits, whereby all of the system processing devices are coupled to each one of the I/O busses through the associated group of I/O bus interface logic circuits;

an arbitration means associated with each of the I/O busses for resolving contentions among the system processing devices for control of that I/O bus; and multiple device controllers comprised of a plurality of device controller sets, the device controllers of each controller set being coupled to an associated one of the I/O busses, and a plurality of I/O devices coupled to the device controllers, wherein said arbitration means comprises arbitration logic in the I/O bus interface logic circuits and in the device controllers.

39. A data processing and transmission network for coupling a plurality of remote information processing systems, said network including:

a plurality of information processing systems remote from one another, each information processing system including a system processing device;

an I/O bus shared by the information processing systems;

a plurality of data transmission means, each of the data transmission means including a bidirectional data transmission link operatively coupled to the associated one of the system processing devices, and an I/O bus interface logic circuit operatively coupled to the data transmission link and further operatively coupled to the I/O bus, whereby each of the data transmission means uniquely couples its associated system processing device with the I/O bus;

wherein each of the I/O bus interface logic circuits includes an arbitration logic circuit, said arbitration logic circuits communicating with one another to resolve contentions among the system processing devices for control of the I/O bus.

40. The network of claim 39 further including:

a set of device controllers coupled to the I/O bus, each device controller including an arbitration logic circuit, and a plurality of data storage devices coupled to the device controllers;

wherein the arbitration logic circuits of the bus interface logic circuits and the arbitration logic circuits of the device controllers communicate with one another via the I/O bus to resolve contentions for control of the I/O bus among the system processing devices and the data storage devices.

41. The network of claim 39 wherein:

each of the data transmission links includes a fiber optic cable with a serial/parallel and electronic/optical data conversion means at opposite ends of the cable.

42. The network of claim 39 wherein:

each of the system processing devices includes a processor interface logic circuit, and each of the data transmission links is coupled to the processor interface logic circuit of its associated system processing device.

* * * * *

UNITED STATES PATENT AND TRADEMARK OFFICE
CERTIFICATE OF CORRECTION

PATENT NO. : 5,586,265
DATED : December 17, 1996
INVENTOR(S) : Beukema

It is certified that error appears in the above-indentified patent and that said Letters Patent is hereby corrected as shown below:

On the title page: Item [57] delete abstract and substitute therefor as shown on the attached page.

Signed and Sealed this

Thirteenth Day of May, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,586,265
DATED : December 17, 1996
INVENTOR(S) : Beukema

It is certified that error appears in the above-indentified patent and that said Letters Patent is hereby corrected as shown below:

ABSTRACT OF THE INVENTION

A data processing and transmission network includes plural information processing systems and shared sub-systems remote from the information processing systems. Each shared sub-system includes an I/O bus and a plurality of I/O bus interface logic circuits coupled to the bus. Each interface logic circuit is coupled to one of the system processing devices via a bidirectional fiber optic link, and thereby couples its associated processing device to the I/O bus. Further fiber optic links couple each system processing device to the I/O bus of each remaining sub-system through an associated I/O bus interface logic circuit. Each sub-system further includes multiple I/O devices, each device coupled to a device controller which in turn is coupled to the I/O bus. The bus interface logic circuits and device controllers incorporate arbitration circuitry and communicate with one another via their associated I/O bus, thus to resolve contentions for control of the bus at the sub-system level rather than at the system processor level. These features provide a network with a high degree of redundancy, substantiallly reduced data access times, and flexibility in network configurations. Regardless of network size, each sub-system I/O device is equally available to all system processing devices, and each system processing device is transparent to the other system processors.